Dec. 4, 1928.　　　　　　　　　　　　　　　　　　1,693,725
M. L. NELSON
IMPULSE TESTING EQUIPMENT
Filed Oct. 18, 1924　　　　3 Sheets-Sheet 1
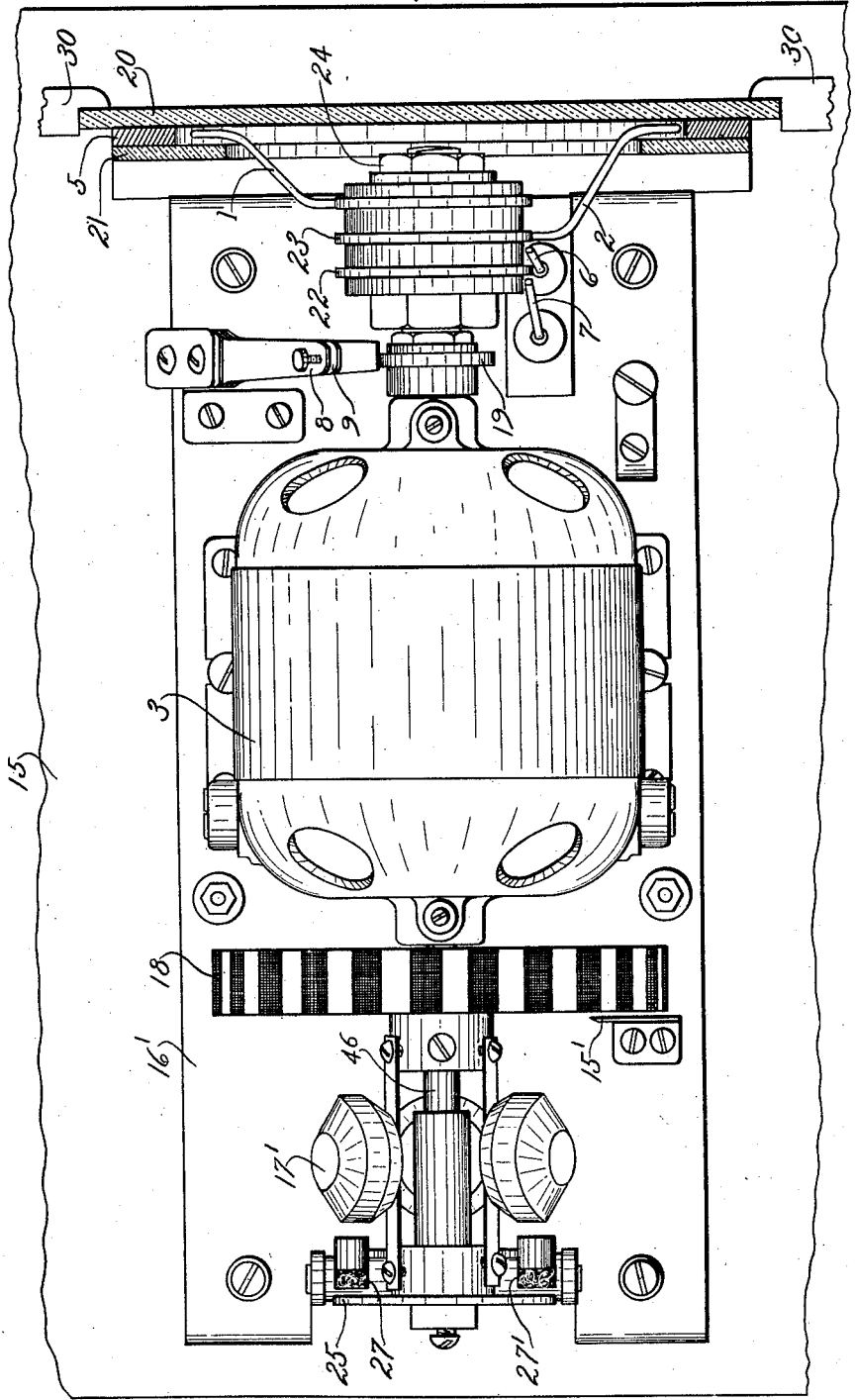
Inventor
Martin L. Nelson Dec. 4, 1928.
M. L. NELSON
1,693,725
IMPULSE TESTING EQUIPMENT
Filed Oct. 18, 1924　　3 Sheets-Sheet 2
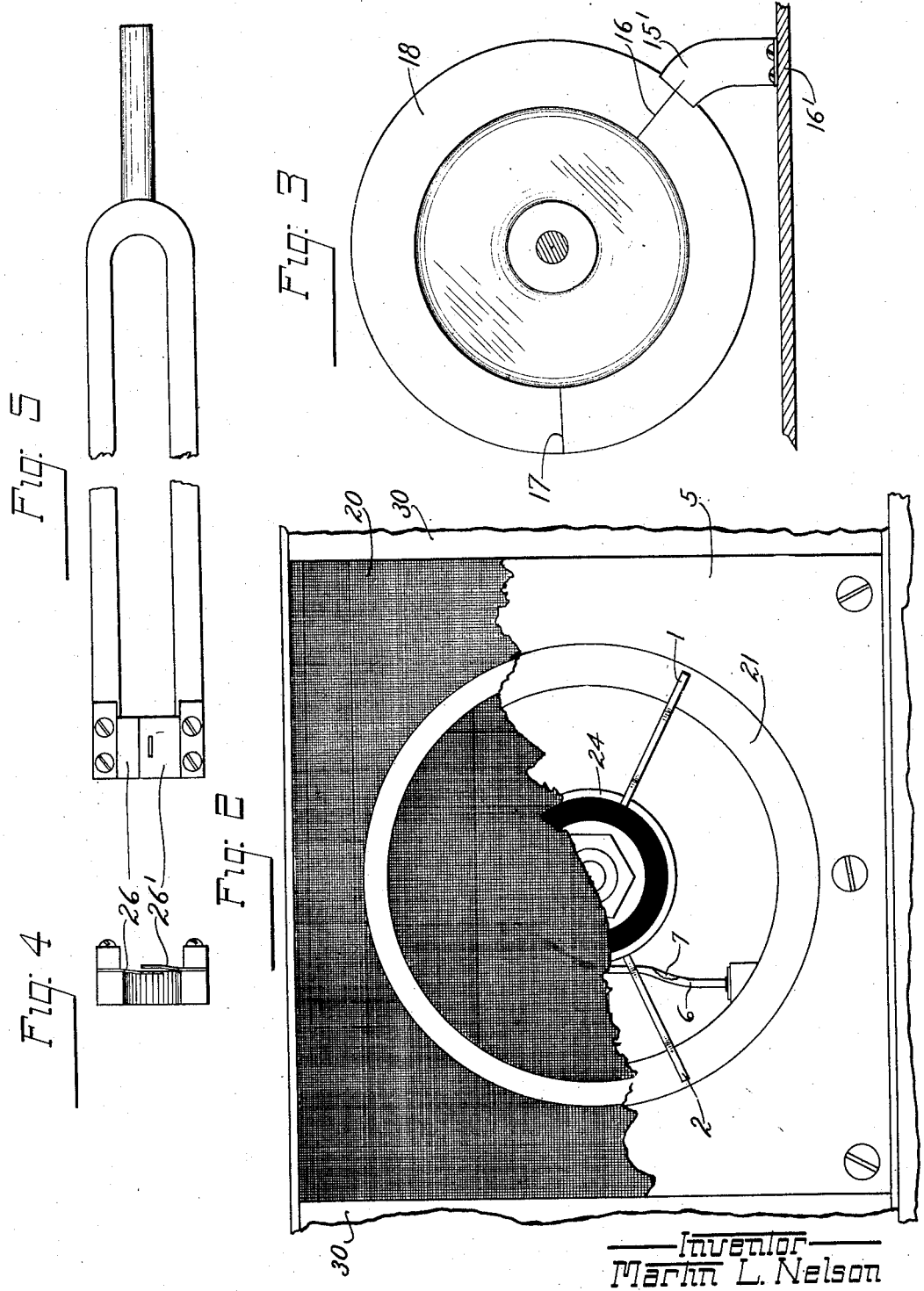
Inventor
Martin L. Nelson Dec. 4, 1928.
M. L. NELSON
1,693,725
IMPULSE TESTING EQUIPMENT
Filed Oct. 18, 1924
3 Sheets-Sheet 3
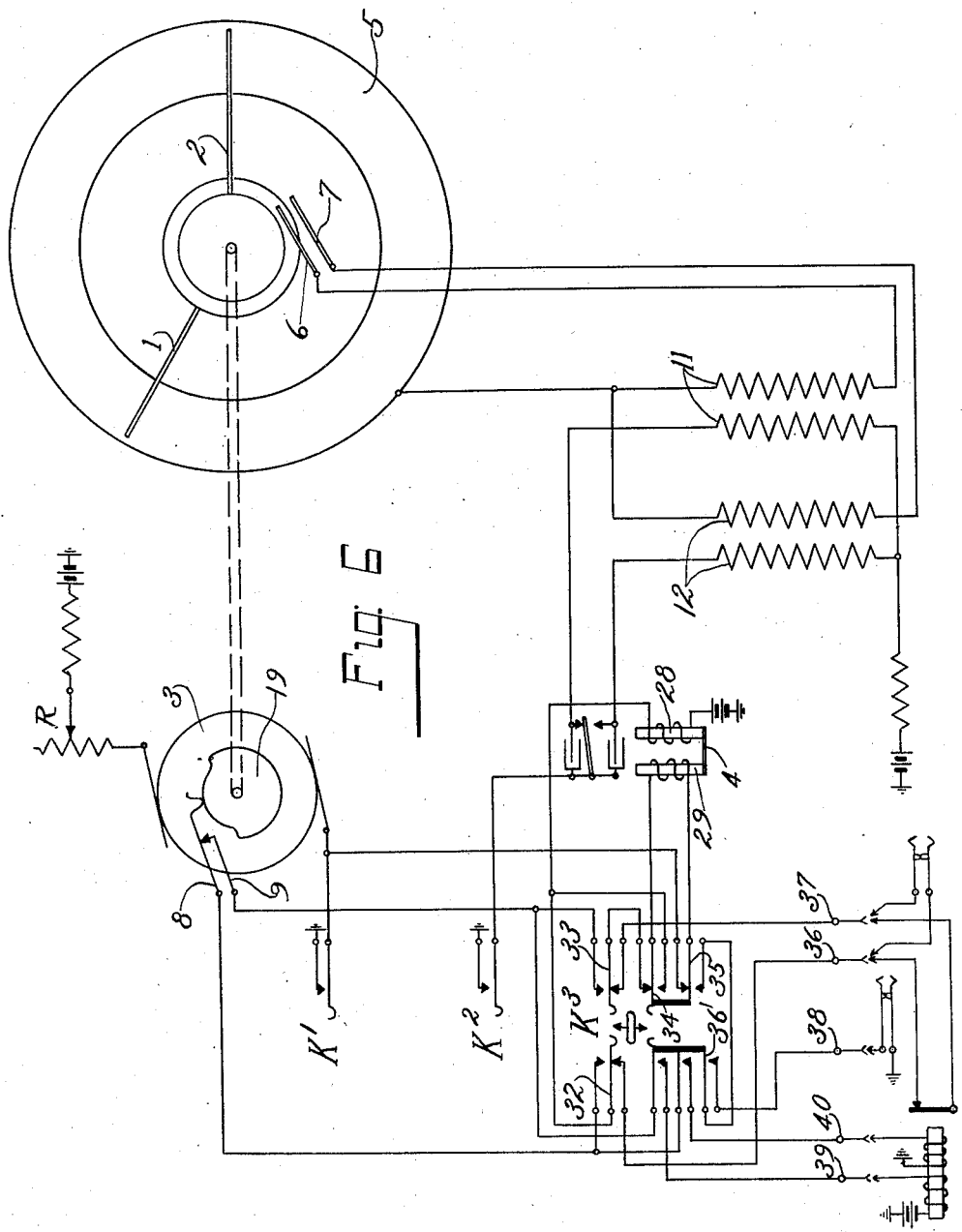
Inventor
Martin L. Nelson
Wm Walter Owen Atty.

Patented Dec. 4, 1928.

1,693,725

UNITED STATES PATENT OFFICE.

MARTIN L. NELSON, OF PARK RIDGE, ILLINOIS, ASSIGNOR, BY MESNE ASSIGNMENTS, TO AUTOMATIC ELECTRIC INC., OF CHICAGO, ILLINOIS, A CORPORATION OF DELAWARE.

IMPULSE-TESTING EQUIPMENT.

Application filed October 18, 1924. Serial No. 744,528.

The present invention relates in general to testing devices or equipment, but is particularly concerned with the provision of a machine for testing electrical impulses delivered by any type of impulsing device.

The object of the invention is to provide a machine which is so designed that it will test the speed of an impulsing device and, at the same time, indicate the length of each impulse, as well as the time lapse between pulses.

In order to facilitate the description, the invention has been illustrated in the accompanying drawings comprising Figs. 1 to 6, inclusive, which show the essential parts of a machine and the associated circuits required for testing impulses from any impulsing device intended to operate the well known Strowger automatic switches used in automatic telephone systems. These switches are designed to operate by impulses transmitted to them at the rate of 10 per second, and operate most successfully when a circuit is closed to their controlling or pulsing relay during thirty-nine per cent of the impulse cycle, thus leaving the circuit open between impulses sixty-one per cent of the impulse cycle.

Referring now to the drawings:—

Fig. 1 shows a portion of a base 15 on which is mounted a sub-base 16' which supports a motor 3, which is shown, together with the various parts operated by it. These parts consist mainly of, a governor 17', balance wheel 18, interrupter cam 19, interrupter springs 8 and 9, adjustable arms 1 and 2, arranged to be rotated by the motor, a metal disc cut out to form a ring 5 surrounding the path of arms 1 and 2, and a pair of brushes 6 and 7.

Fig. 2 is an end view of part of Fig. 1, with part of the window 20 broken away.

Fig. 3 is a side view in elevation of the balance wheel 18 together with a portion of the sub-base 16' which supports a marker 15' used in connection with the balance wheel for checking up on the accuracy of impulse cam 19.

Fig. 4 is an end view of a tuning fork used in checking up the speed of the motor; while Fig. 5 is a side view of the tuning fork.

Fig. 6 is a schematic drawing of the equipment and its associated circuits. This circuit diagrammatically shows two induction coils 11 and 12, respectively, and a relay 4. These parts are mounted on that portion of base 15 of Fig. 1 which is broken away. The various keys shown and the rheostat R are mounted on that part of the panel 30 of Figs. 1 and 2 which is broken away.

In conditioning the testing equipment for operation the motor 3 is adjusted to maintain a speed of 600 revolutions per minute, or ten revolutions per second. This speed corresponds to the previously mentioned standard impulsing speed of ten cycles per second. It will be seen, therefore, that the ends of the arms 1 and 2, being rotated by the motor, will pass a given point, once each cycle.

By operating the switching key $K^3$ upward both windings of switching relay 4 are connected in circuit with impulse springs 8 and 9 of the test machine. This circuit extends from battery, winding 28 of relay 4, operating spring 32 of switch $K^3$ and its working contact, impulse springs 8 and 9, working contact and operating spring 33 of the switch $K^3$, resting contact and operating spring 34, winding 29 of relay 4, operating spring 35 and its resting contact, through the key $K'$ to ground. The impulse springs are operated by a standard cam 19 and deliver a standard impulse. If the cam is of proper ratio and is properly mounted on the shaft of the motor it will break contact between springs 8 and 9 when point 16 on the balance wheel 18 is in alignment with marker 15' (see Fig. 3), and when point 17, on the balance wheel is placed in alignment with marker 15', the springs should just make contact. The markings on the wheel 18 are not subject to wear as is the cam and therefore always serve as points of reference.

The manner of adjusting the test equipment for operation is as follows:

The spark control key $K^2$ and motor start key $K'$ should first be operated. The spark control key connects ground to the armature of switching relay 4, while the motor start key, in addition to starting the motor, completes a circuit through the spark switching relay 4 as above described. The motor revolves the sparking arms 1 and 2 and the standard impulse cam 19, which operates the impulse springs 8 and 9 to cause the spark switching relay 4 to periodically energize and deenergize. The operation of the spark control key $K^2$ resulted in a circuit being closed through the primary winding of induction coil 11 via the armature and back contact of the spark switching relay and, therefore, upon energization of the spark switching relay, the circuit extending through the primary winding of the induction coil 11 is broken, causing a spark to be induced between the sparking ring 5 and arm 2 over a circuit extending from the secondary winding of induction coil 11 to ring 5, and from the other terminal of the secondary winding to arm 2 via brush 6. The relay 4, upon energizing, also completes a circuit through the primary winding of induction coil 12. Upon deenergization of the spark switching relay, the primary circuit of the induction coil 12 is broken, and a spark is induced between the ring 5 and the arm 1. It will be noted that the brushes 6 and 7 for carrying the secondary circuit through the induction coils 11 and 12 to arms 1 and 2 do not touch the metal rings 22 and 23. This is done to eliminate any brush contact, which is, of course, unnecessary due to the high voltage used. The arms 1 and 2 may be adjusted by loosening nut 24, and when properly set, the two sparks will appear at the same point and will to all appearances be one spark. This adjustment is necessary since the spark switching relay 4 does not usually have quite the same period of pulling up as falling away. However, when the arms 1 and 2 are so adjusted that they compensate for the variation in operation of the relay, the machine will be ready for testing other impulsing devices.

By restoring the switching key K³ to normal, the windings 28 and 29 of the relay 4 are connected to terminals 36 and 37, respectively. The circuit for winding 28 extends from battery, winding 28, operating spring 32 of key K³ and its resting contact to the terminal 36. The circuit of winding 29 extends from ground through springs of key k', resting contact and operating spring 35, winding 29 through operating springs 34 and 33 and their respective resting contacts to terminal 37. Now by connecting any kind of impulsing device, used in controlling a loop circuit, across these terminals and operating it, it can be tested. A good example of a device of this character is the ordinary two-wire calling device.

It will be appreciated that, as the spark switching relay 4 makes and breaks its make contact under control of the device under test, a spark will jump from the arm 1 to the ring. Likewise, a spark will jump from the arm 2 to the ring each time the back contact is made and broken again. This gives a total of two sparks per cycle.

The indication of a standard impulse is as follows:

If the ratio of make to break is proper and the speed standard, the sparks appear in the same place and are stationary, and to all appearances are one spark.

However, if the impulsing device under test has an improper ratio of make to break, the two sparks will be separated. The reason for this is as follows:

We will assume that the calling device under test is standard, as regards speed, and that the length of time the circuit is broken is greater than standard. Under these conditions, the time interval between the two sparks will be shorter than standard and a spark from the arm 1 will jump before that arm has revolved to a position where the spark of arm 2 appeared.

On the other hand, if the ratio is such that the circuit is closed longer than the standard period, the sparks will be farther apart so that the arm 1 will revolve past the spot where the first spark of arm 2 appeared before the second spark produced by arm 2 occurs. As soon as the cam ratio is corrected to standard, the two sparks will again appear as one.

In case the ratio is standard and the speed of the impulses under test is slower than standard, the time between sparks will thus be greater than standard, so that the number 1 arm will rotate past the spot where the first spark occurred before the spark re-occurs on the same arm on the succeeding cycle, so that on each succeeding cycle, the sparks appear farther around the ring than during the preceding cycle and, therefore, the sparks appear to be traveling in the direction of rotation of the arms, which is counter-clockwise, although they appear as one spark.

On the other hand, if the speed of the impulse device is greater than standard, the sparks appear earlier each cycle than they did during the preceding cycle, so that the sparks appear to be traveling in a clockwise direction.

Now, if it so happens that the calling device under test has a cam of improper or unstandard ratio, and is also operating slower than standard, the sparks will be separated and will also appear to be traveling in the direction of rotation of the arms.

Conversely, if the device under test has a cam of improper ratio and the speed of the device is greater than standard, the sparks will be separated and appear to be traveling in a clockwise direction.

If the impulse transmitting device which it is desired to test is designed to transmit ground impulses the switching key K³ is operated downward and the device is connected to terminal 38. Each time the device under test grounds this terminal a circuit is completed for relay 4 as follows: grounded terminal 38, working contact and operating spring 36' of key K³, working contact and operating spring 35, winding 29, operating spring 34 and its working contact, and the winding 28 of relay 4 to battery. The relay 4 is, therefore, influenced by grounded impulses and brings about the same tests as previously described.

In order to make observation of the sparks possible with a minimum of effort, a window 20 (see Fig. 2) is placed in front of the arms 1 and 2 the entire window, with the exception of a narrow circular space, is covered with a black non-transparent substance so that only the ends of arms 1 and 2 may be seen. A black background for that part of the arms 1 and 2 which is visible through the window 20 is provided by insulating material 21 which supports the sparking ring 5.

In certain instances it may prove of an advantage to be able to test switch adjustments with the impulse testing equipment. To do this, it is only necessary to operate the key K³ downward and connect terminals 39 and 40 to the pulsing relay of the switch to be operated. The terminals 39 and 40 are at this time connected to the impulse springs 8 and 9 of the test equipment, by way of the associated make contacts on key K³. The circuit of the connected line relay will then be interrupted periodically by impulse springs 8 and 9. If a check-up as to how the line relay is delivering or repeating the impulses is desired its contacts may be bridged across terminals 36 and 37. The resulting tests will be indicated as if an ordinary two-wire calling device were connected to terminals 36 and 37.

*Speed control.*

It is, of course, necessary to maintain practically constant speed in the motor since the standard speed of the motor is the point of reference for observation. Therefore, the motor is equipped with a rheostat R, a heavy balance wheel 18 (see Figs. 1 and 3), and a fly-ball governor 17' which causes a metal disc 25 on the shaft 46 to press against two leather buttons 27 and 27' with a pressure varying with the speed of the motor. These leather buttons are mounted on a yoke which can be adjusted backward or forward, with reference to the disc, so that the motor speed may be set to any desired value within a certain range. The proper procedure for adjusting the speed of the motor is to cut in as much resistance as possible with the rheostat R to bring the motor to slightly above the desired speed. This will prevent the governor from putting too great a load on the motor controlling the variation in speed due to voltage variation. In order to get best results, the governor should always cause the leather buttons to cause some drag on the motor, but this should, of course, be as little as possible and still perform its function in speed regulation.

In order to set the speed of the motor at the proper value, the special tuning fork, shown in Figs. 4 and 5, is provided. This tuning fork makes 120 vibrations per second and is equipped with two metal strips 26 and 26', respectively, the strip 26 is fastened to one tine of the fork while strip 26' is fastened to the other tine. These metal strips overlap inside the tines, as clearly shown in Fig. 4 of the drawings and, within the overlapping portion, a narrow slit is cut through each strip so that by holding the fork close to the eye, vision through the slits is possible each time the slits register. This happens every vibration or 240 times per second, so that 240 visions per second are possible.

The periphery of the balance wheel 18 is divided equally into forty-eight sections, twenty four of these sections being painted black and twenty four white. Now, if the rotating fly-wheel is viewed through the slits in the vibrating fork, the sections on the wheel will appear to stand still when the motor is running at proper speed. This is 600 revolutions per minute or ten revolutions per second. Since there are twenty-four black sections on the wheel, these sections pass a given point at the rate of twenty-four times ten or 240 per second, thus the fork which provides 240 visions per second will cause the sections to appear stationary since the sections are passing a given point at the rate of 240 per second.

If the motor is running at a higher rate than ten revolutions per second, more than 240 sections will pass a reference point per second and the sections will appear to drift counter-clockwise. This is true since the consecutive sections, as they pass the reference point, will be farther advanced than the preceding sections.

On the other hand, if the motor is running slower than ten revolutions per second, the sections will appear to drift clockwise, since of two consecutive sections the fork permits a vision of the second section before it has reached the point at which the first section was seen.

In order to secure accurate results in testing the speed of the motor, the following instructions should be carefully followed. To start the fork vibrating, it should be held by its handle well away from the tines, and then given a light blow in a plane perpendicular to the tines. After it is vibrating, the window end should be held close to the eye and the fly-wheel viewed at a distance of about twelve inches. If the wheel is rotating at proper speed, it will appear to stand still.

From the above, it will readily appear that applicant has devised equipment which very accurately tests both the ratio and speed of an impulse device and makes these tests simultaneously.

What is claimed is:

1. In an apparatus for observing the characteristics of a repeated operation, a rotating device driven at a standard speed carrying sparking arms angularly displaced a distance corresponding to the distance between distinctive points in a cycle of the repeated operation, means under control of the repeated operations for generating and feeding high tension current to said arms in succession at the distinctive points in the cycles, the variation of angular position of successive sparks indicating any deviation between the distinctive points in the cycles or frequency of the repeated operations from the standard represented by relative position of said arms and the constant speed of the rotating device.

2. In an apparatus for observing the characteristics of a repeated operation, a rotating device driven at a standard speed, a plurality of angularly spaced arms rotated by said device and corresponding in number to the number of points in a cycle to be observed, a fixed ring adjacent to the path inscribed by the free ends of said arms, means controlled by the repeated operation for transmitting sparks between said arms and ring at intervals which cause them to occur at the same point of the ring when the standard speed is maintained so that the position of successive sparks may indicate any deviation from the standard speed represented by the constant speed of the rotating device and from the standard conditions represented by the angular setting of the arms.

3. In a device for testing the ratio and speed of an impulse cam, a pair of spark gaps angularly displaced from each other a distance dependent on the ratio of the impulse cam to be tested and means for rotating them at a speed corresponding to the proper speed of the impulse cam under test, and means under control of the cam under test for causing sparks to be transmitted across said gaps in succession at a speed and time making them appear at a fixed point and as one spark when the cam speed and ratio coincide with the setting and speed of said gaps.

4. In a device for testing the ratio and speed of an impulse cam, a pair of spark gaps comprising a fixed element and two definitely spaced movable elements, means for rotating said elements at a speed corresponding to the proper speed of the impulse cam under test, means controlled by the cam under test for causing sparks to occur between said gaps alternately at a fixed point of the fixed element and appear as one when the cam under test is correct as to ratio and speed and effective when the cam speed is correct but the ratio wrong for causing the sparking across said gaps to occur at separate points deviating from the fixed point of reference and to clearly appear as two separate sparks.

5. In a device for testing the ratio and speed of an impulse cam, a pair of spark gaps comprising a fixed element and two definitely spaced movable elements, means for rotating said elements at a speed corresponding to the proper speed of the impulse cam under test, means controlled by the cam under test for causing sparks to alternately occur between said gaps at the same fixed point and appear as one when the cam under test is correct as to ratio and speed and effective when the ratio is correct but the speed wrong for causing the sparks across the two gaps to appear as one but to appear to be traveling in a direction depending on the speed of the cam.

6. In a testing apparatus, a plurality of arms having free ends spaced a definite distance from each other, a ring adjacent and in like relation to said arms, means for rotating said arms at a constant speed, and means controlled by the device under test for alternately producing sparks between said arms and ring.

7. In an apparatus for testing the speed and cam ratio of an impulse transmitting device, a pair of arms having their free ends spaced from each other a distance depending on the make and break ratio of the cams of the impulse transmitting devices to be tested, an arcuate metal ring adjacent and in like relation to said arms, means for rotating said arms at a constant speed coinciding with the correct speed of an impulse transmitting device, and means for alternately producing sparks between said arms and ring at points of the ring dependent on the cam ratio and speed of the device under test.

8. In a testing device for impulse transmitting devices, a shaft operating at a constant speed, a pair of arms secured to said shaft angularly displaced with respect to each other a distance coinciding with two distinctive points in the cycle of operation of a calling device, a metal ring adjacent to said pointers, two induction coils each having a terminal of its secondary winding connected to said ring and each having its other terminal inductively connected with one of said arms, a relay connected in circuit with a calling device to be tested, a circuit for said relay alternately opened and closed when the calling device to be tested operates and circuits for the primary windings of said induction coils controlled by said relay to cause the alternate transmission of sparks between the respective arms and said rings to occur at the same definite point of said ring when the speed of the arm coincides with the speed of the calling device, and when the distinctive points in the cycle of the calling device coincides with the angular displacement of said arms.

In witness whereof, I hereunto subscribe my name this 15th day of October, A. D., 1924.

MARTIN L. NELSON.